Sept. 3, 1929.   R. F. KOHR   1,726,743
BRAKE
Filed June 15, 1927   2 Sheets-Sheet 2
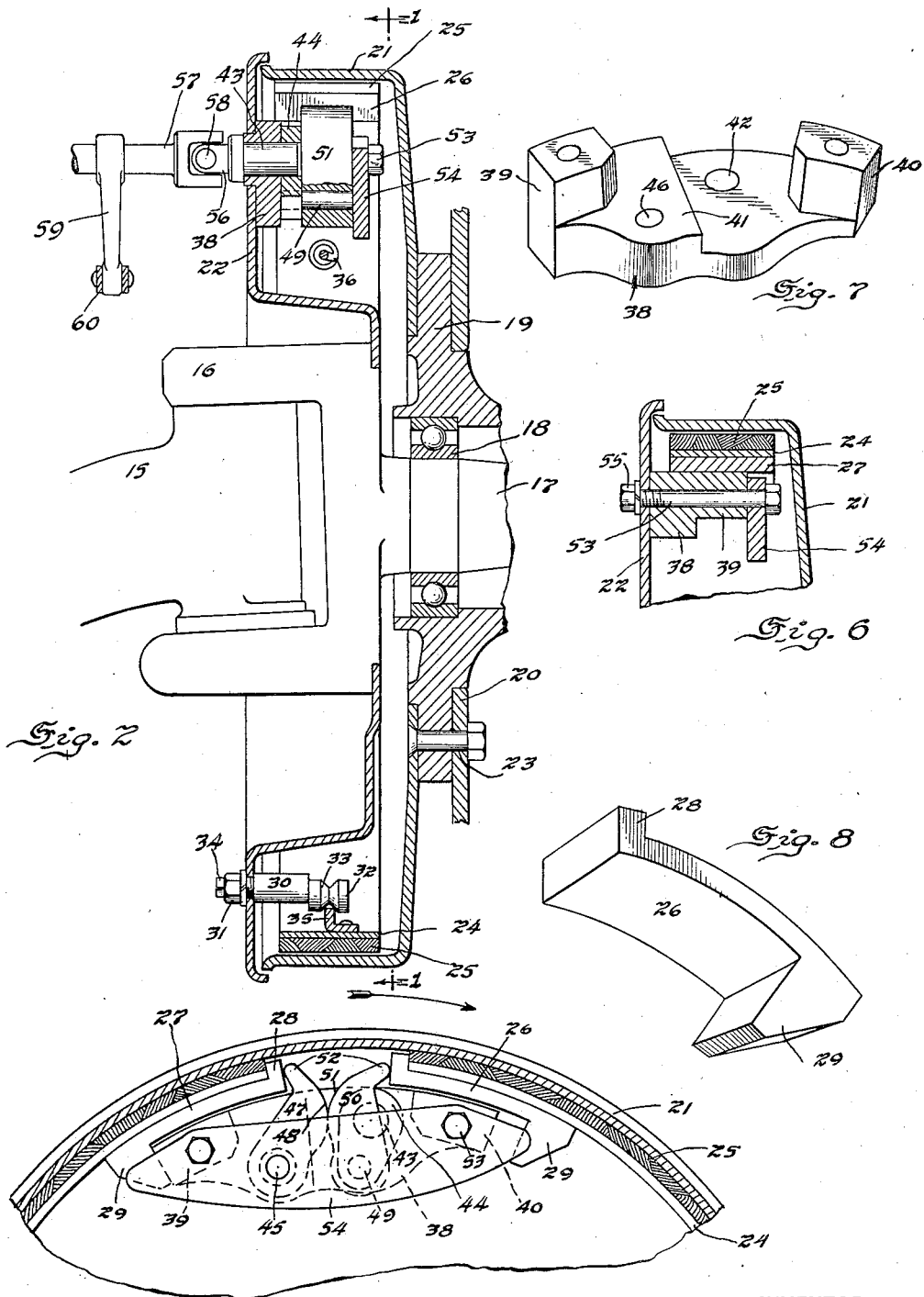
INVENTOR
Robert F. Kohr
BY
P. W. Pomeroy
ATTORNEY Patented Sept. 3, 1929.

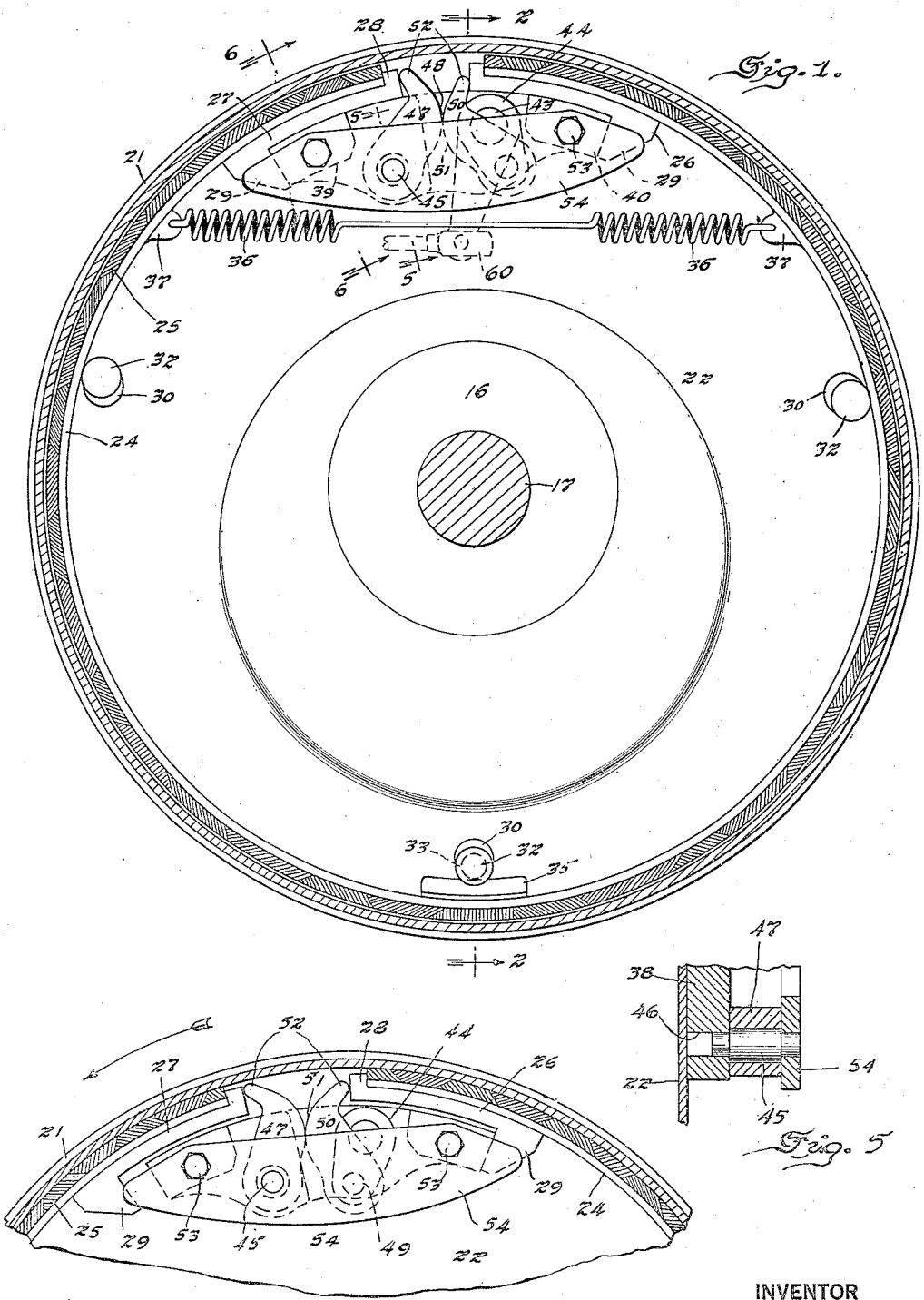

1,726,743

UNITED STATES PATENT OFFICE.

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY.

BRAKE.

Application filed June 15, 1927. Serial No. 199,016.

This invention relates to vehicle brakes and particularly to the operating mechanism therefor.

The maximum efficiency of an internal floating brake is obtained by expanding the brake element, which will be referred to in the following description as the brake, in a true circumferential direction. Brake constructions previously used have not generally been provided with efficient and satisfactory means for expanding the brake in this manner. Rotatable cams and toggle arrangements have been frequently used but they have not proved entirely satisfactory as they do not permit an even application of pressure for expanding the brake and produce excessive braking action at the ends of the brake which encourages chattering and seizing of the same with the brake drum and which also causes the friction facing to wear unevenly. Many of the internal brakes heretofore used are provided with brake applying means which do not permit the brakes to be applied as efficiently when the vehicle is moving rearwardly as when it is moving forwardly and it is, therefore, the principal object of this invention to provide an internal brake with brake applying means which is equally as efficient during rearward movement of the vehicle as during forward movement thereof.

Another object of this invention is to provide an internal brake with a pair of pivoted levers slidably engaging each other for expanding the brake in a circumferential direction to frictionally engage the rotating brake drum.

Another object is to provide an internal floating brake with an expanding mechanism consisting of a pair of levers, the faces of which slidably engage each other, which will apply pressure to one end of the brake in a circumferential direction when the brake drum is rotating in one direction and which will apply equally as efficient pressure to the other end of the brake when the drum is rotating in the opposite direction.

Another object is to provide an internal floating band brake with a band expanding mechanism comprising a lever pivotally mounted at its lower extremity and engaging one end of the brake band at its upper extremity substantially in the circular path thereof, a bodily movable lever pivotally mounted at its lower extremity to a rotatable bell crank and engaging the other end of the brake band substantially in the circular path thereof, both levers slidably engaging each other, and means for rotating the bell crank whereby both levers act against each other to expand the brake band in a circumferential direction.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section of the right front wheel of a motor vehicle taken on the line 1—1 of Figure 2, showing the parts of the brake expanding mechanism in normal inoperative position.

Figure 2 is a transverse section taken on the line 2—2 of Figure 1, a portion of which is broken away to more clearly show the construction of the brake expanding mechanism.

Figure 3 is a partial section similar to Figure 1, showing the operative position of the parts of the expanding mechanism when the brake drum is rotating in a clockwise direction.

Figure 4 is a section similar to Figure 3, showing the position of the brake expanding mechanism when the brake drum is rotating in a counter-clockwise direction.

Figure 5 is a section taken on the line 5—5 of Figure 1, showing the method of pivoting one of the brake expanding levers.

Figure 6 is a section taken on the line 6—6 of Figure 1.

Figure 7 is an enlarged perspective view of the support for the brake expanding mechanism.

Figure 8 is an enlarged perspective view of one of the brake end brackets.

The brake operating mechanism of this invention may be applied to any of the types of internal brakes. It is, however, particularly adaptable to a free floating flexible band type and will be described in connection with the same in the following specification.

Referring to the accompanying drawings, in which like numerals refer to like parts throughout the several views, a steering knuckle 16 is pivoted to a conventional front axle 15 and has an outwardly extending stub axle 17 formed thereon. The stub axle 17 carries bearings 18 which rotatably support a wheel hub 19 to which a vehicle wheel 20 and a brake drum 21 are concentrically secured by bolts 23. A brake drum dust cover 22 is rigidly attached to the steering knuckle 16 in adjacent relationship to the brake drum 21 so as to exclude as much dirt and the like as possible.

Concentrically arranged within the drum 21 is a split expandable band 24 preferably made of high grade spring steel and faced with a suitable friction material 25. Brackets 26 and 27, one of which is shown in perspective in Figure 8, formed with upwardly extending projections 28 and downwardly extending stop portions 29, are secured to the band 24 with the sides of the projections 28 abutting against the extreme transverse ends of the band 24.

Secured to the dust cover 22 approximately 120 degrees apart are three adjusting devices, the center one being diametrically opposite from the actuating mechanism and this member while acting in conjunction with the other members as an adjusting device also serves as a means for centering the band 24 and preventing transverse displacement of the same relative to the brake drum 21. Each of the devices comprises a shouldered pin 30, secured to the dust cover by a nut 31, having an eccentrically disposed cylindrical portion 32. The centering device above mentioned is, in addition, provided with an approximately 45 degree groove 33 formed in the periphery of the eccentric portion 32. The groove 33 is adapted to receive and bear against the upstanding flange of an L-shaped bracket 35 secured to the inner surface of the band 24. As seen in Figure 2, the angularity of the walls of the groove 33 while providing an efficient centering means also serves to prevent rattling. As also seen in Figure 2, the end 34 of the pin 30 projecting through the nut 31 is squared to facilitate the use of a wrench to rotate the pin 30 and effect an adjustment of the clearance between the band facing 25 and the inner surface of the drum 21.

A coil spring 36, having its ends hooked through lugs 37 at opposite sides of the band 24, is provided to draw the band to normal inoperative position out of engagement with the brake drum 21.

The brake operating mechanism is so constructed that it may be assembled to the brake as a unitary assembly. The support 38 for this assembly, as shown in perspective in Figure 7, is provided with an elevated portion 41 at one end and two opposite outwardly extending projections 39 and 40 at both ends. Extending through an opening 42 is a rotatable shaft 43 to which a bell crank 44 is secured, the outer surface thereof lying in the same plane as the elevated portion 41 of the support 38. A pin 45 being reduced in diameter at its ends is positioned perpendicular to the support with one of its reduced ends pivotally received in an opening 46 in the raised portion 41 of the support 38. Pivoted on the enlarged portion of the pin 45 is a lever 47 having a curved face 48, the other reduced end of the pin 45 extending beyond the surface of the lever 47.

Pivoted to the free end of the bell crank 44 is a lever 50 having a cam face 51 similar to the lever 47. Both levers 47 and 50 are formed with projecting lips 52 which engage the ends of the brackets 26 and 27 on lines which lie substantially in the circular path of the brake band 24. The band 24, because of its resistance to expansion, causes the ends of the levers 47 and 50 to be moved toward each other and the cam faces 48 and 51 thereof are brought into slidable contact with each other. Secured to the support 38 by bolts 53, which extend through the projecting portions 39 and 40 of the bracket 38, is a cover plate 54 in which the reduced end of the pin 45 is received. The plate 54 retains the levers 47 and 50 and the bell crank 44 in position on the support 38 and it, in combination with the support 38, serves as a guide for the ends of the brake band 24. The bolts 53, which secure the plate 54 to the support 38, extend through the dust cover 22 and are held therein by nuts 55 which firmly secure the support 38 to the dust cover 22.

The end of the shaft 43 projecting through the dust cover 22 is formed with a yoke 56 to which a yoked shaft 57 is universally connected by cross pins 58. This shaft 57 is rotated by means of an arm 59 pivoted to the end of a brake rod 60 which is actuated by some source of braking pressure such as a brake pedal.

In Figure 1, which shows the parts of the brake mechanism of the right front wheel of a motor vehicle in inoperative position, the stop portions 29 of the brackets 26 and 27 respectively abut against the outwardly extending projections 40 and 39 of the support 38. Figure 3 shows the relative position of the parts when the vehicle, having the brakes incorporated thereon, is moving forwardly, that is, when the drum 21 is rotating in a clockwise direction. Pressure applied through the brake rod 60 rotates the bell-crank 44 in a clockwise direction to actuate the bodily movable lever 50. This lever 50, in being moved by the bell-crank 44, pivots about the pin 49 and at the same time the cam face 51 thereof slides along the cam face 48 of the lever 47 to exert sufficient pressure to pivot that lever about its pivot pin 45, consequently both levers 47 and 50 pivoting in opposite directions expand the band 24 so that the stops 29 disengage the support projections 39 and 40. In this position the brake facing 25 momentarily engages the rotating drum 21 and the band 24 rotates therewith until the stop 29 of the bracket 27 abuts against the projection 39 on the support 38 to prevent further rotation of the band 24. This movement of the brake band 24 may for the sake of description be termed as initial expansion. The bracket 27, because of the resistance of that end of the band 24 to movement in a counterclockwise direction, prevents further pivotal movement of the lever 47 and serves as a stop therefor. Further rotation of the bell crank 44 causes the lever 50 to slide on the lever 47 and pivot thereon to expand the band 24 into further frictional engagement with the drum 41 to retard its rotation. The end 52 of the lever 50 exerts pressure against the bracket 26 in a line substantially in the circular path of the band 24 to expand the band in a direction circumferential of the drum 21, thereby causing even frictional engagement of the facing 25 therewith.

It can be seen in Figure 4 that the brake is equally efficient when the vehicle is moving rearwardly, that is, when the drum 21 is rotating in a counter-clockwise direction. Initial expansion of the band occurs in the same manner as previously described with the exception that in this case the stop 29 of the bracket 26 abuts against the projecting portion 40 of the support 38. Further rotation of the bell crank 44 causes the lever 50 to pivot about the end of the bracket 26 and to slide on the lever 47 to force this lever to swing in a counter-clockwise direction and expand the band 24 in a circumferential direction into frictional engagement with the rotating drum 21.

From the foregoing description, the advantages of the present invention are readily apparent. It can be seen that the brake will operate as efficiently when the vehicle is moving in a rearward direction as when it is moving in a forward direction. It can also be seen that the operating mechanism is simple in construction and requires only a few parts which makes it economical to manufacture. Further, it can be seen that the operating mechanism applies pressure to the ends of the brake in such a manner that the brake is expanded in a direction circumferential of the drum whereby the maximum efficiency of the brake is obtained.

Formal changes may be made in the specific embodiment of the invention described without departing from the spirit and substance of the broad invention, the scope of which is commensurate with the appended claims.

What I claim is:

1. In a brake mechanism, a rotatable drum, braking means movable to engage said drum, and a pair of pivoted levers engageable with said braking means, one of said levers being slidable on the other to move said braking means into engagement with said drum.

2. In a brake mechanism, a rotatable drum, braking means engageable therewith, a pair of pivoted levers slidably engaging each other movable to engage the ends of said braking means substantially in the circular path thereof for actuating said braking means to engage said drum, and means for actuating said levers to move said braking means into engagement with said drum.

3. In a brake mechanism, a rotatable drum, a dust cover therefor, braking means engageable with said drum, and actuating means supported by said dust cover for said braking means comprising members engageable with said braking means, one of said members having slidable engagement with the other of said members for moving said braking means into engagement with said drum.

4. In a brake mechanism, a rotatable drum, braking means engageable therewith, a pair of pivoted levers engageable with the ends of said braking means substantially in the circular path thereof, one of said levers having a movable pivot point and having slidable engagement with the other of said levers for moving said braking means into engagement with said drum.

5. In a brake mechanism, a rotatable drum, braking means engageable therewith, a pivoted lever engageable with one end of said braking means substantially in the circular path thereof, a rotatable bell crank, a second lever pivoted to said bell crank and having slidable contact with the other of said levers engageable with the other end of said braking means substantially in the circular path thereof, and means for rotating said bell crank to move said levers for expanding said braking means to engage said drum.

6. In a brake mechanism, a rotatable drum, braking means engageable therewith, a pivoted cam-faced member engageable with said braking means, a bodily movable cam-faced member slidably engageable therewith, and engaging said braking means, a rotatable bell crank pivoted to said bodily movable member, and means for rotating said bell crank to actuate said bodily movable member for causing both of said members to move said braking means to engage said drum.

7. In a brake mechanism, a rotatable drum, braking means engageable therewith, a support, a lever pivoted on said support, a bell crank rotatable on said support, a bodily movable lever pivoted on said bell crank, said levers engaging the ends of said braking means substantially in the circular path thereof and having oppositely disposed curved faces slidably engaging each other, and means for rotating said bell crank for moving said levers to expand said braking means into frictional engagement with said drum.

8. In a brake mechanism, a rotatable drum, braking means therein engageable therewith, means for applying pressure to the ends of said braking means for expanding the same in a circumferential direction to engage said drum, said means comprising a pair of levers engaging the ends of said braking means substantially in the circular path thereof, and having oppositely disposed curved faces engaging each other, a bell crank pivoted to one of said levers, and means for actuating said bell crank to thereby move said levers to engage said braking means with said brake drum.

9. In a brake mechanism, a rotatable drum, a free floating circular brake band engageable therewith, means for applying pressure to the ends of said band circumferentially thereof comprising, a cover for said drum, a lever pivoted thereto, a bodily movable second lever engaging said lever, the upper extremities of said levers engaging the ends of said brake band approximately in the circular path thereof, and means carried by said cover for moving the lower extremity of said second lever for actuating both of said levers.

10. In a brake mechanism, a rotatable drum, a free floating split circular band engageable therewith, means for applying pressure to the ends of said band circumferentially thereof comprising a support, a cam-faced lever pivoted thereto, an oppositely disposed cam-faced bodily movable lever engageable therewith, the upper extremities of said levers engaging the free ends of said band approximately in the circular path thereof, and a rotatable bell crank pivoted to the lower extremity of said bodily movable lever for moving the same to cause both of said levers to expand said band into frictional engagement with said drum.

11. In a brake mechanism, a rotatable drum, a free floating circular band engageable therewith, a support having projecting lugs normally engaging stop members adjacent the ends of said band, a pair of pivoted levers mounted on said support, said levers having oppositely disposed curved faces slidably engageable with each other and having spaced ends engageable with the ends of said band substantially in the circular path thereof, movement of said levers expanding said band in a circumferential direction, one of said stop members engaging its adjacent lug to prevent rotation of said band when engaging said drum.

12. In a brake mechanism, a rotatable drum, a free floating circular brake element engageable therewith, a support having outwardly projecting lugs normally engageable with stop members adjacent the ends of said brake element, a cam-faced lever pivoted to said support and engaging an end of said band substantially in the circular path thereof, a bodily movable cam-faced lever engageable with said pivoted lever and engageable with the other end of said band substantially in the circular path thereof, a bell crank rotatably mounted on said support pivoted to said bodily movable lever, movement of said bell crank moving said levers to expand said brake element to engage said drum whereby said element is rotated until one of said stop members engages its adjacent lug to prevent further rotation of said element, further movement of said bell crank causing one of said levers to pivot and slide on the other of said levers for expanding said element in a circumferential direction to further engage said drum.

13. In a brake mechanism, a rotatable drum, a brake element engageable therewith, a support, a lever pivoted to said support and a bodily movable lever engageable therewith, the upper ends of said levers contacting with the ends of said brake element, a lever retaining plate secured to said support, and a rotatable bell crank pivoted to said bodily movable lever, rotation thereof moving said levers for expanding said element to engage said drum.

14. In a brake mechanism, a rotatable drum, braking means movable to engage said drum, a pair of pivoted levers having oppositely disposed cam-shaped faces engageable with each other and slidable relative to each other, said levers also engaging said braking means, and means for actuating said levers to move said braking means into engagement with said drum.

15. In a brake mechanism, a rotatable drum, braking means movable to engage said drum, and a pair of members engaging said braking means, one of said members having a cam-shaped face slidable on said other member whereby movement of one of said members causes said braking means to engage said drum.

16. In a brake mechanism, a rotatable drum, braking means movable to engage said drum, and a pair of members housed within said drum engaging said braking means, said members being shaped to contact with each other and slide relative to each other whereby movement of said members causes said braking means to engage said drum.

17. In a brake mechanism, a rotatable drum, a dust cover therefor, braking means movable to engage said drum, and a pair of levers pivotally supported by said dust cover engageable with said braking means, one of said levers being slidable on the other to move said braking means into engagement with said drum.

18. In a brake mechanism, a rotatable drum, braking means movable to engage said drum, and a pair of pivoted levers housed within said drum engaging said braking means, said levers having sliding engagement with each other for moving said braking means into engagement with said drum.

19. In a brake mechanism, a rotatable drum, a cover for the open side of said drum, braking means movable to engage said drum, a lever pivotally supported by said cover, an arm pivotally supported on said cover, and a lever pivotally supported by said arm, one of said levers being slidable on the other lever to move said braking means into engagement with said drum.

20. In a brake mechanism, a rotatable drum, a cover for the open side of said drum, braking means expandable to engage said drum, and means including a pair of pivoted levers supported by said cover for expanding said braking means into engagement with said drum, one of said levers being slidable on the other lever when expanding said braking means.

21. In a brake mechanism, a rotatable drum, a cover for the open side of said drum, braking means movable to engage said drum, a rock-shaft supported by said cover, a lever pivotally supported by said rock-shaft on a center opposite from the axis of said shaft, and a second lever pivotally supported by said cover, one of said levers being slidable on the other lever to move said braking means into engagement with said drum.

22. In a brake mechanism, a rotatable drum, a cover for the open side of said drum, braking means movable to engage said drum, and a pair of oppositely disposed cam shaped levers engageable with each other and slidable relative to each other pivotally supported by said cover, and means for actuating said levers to move said braking means into engagement with said drum.

23. In a brake mechanism, a rotatable drum, braking means having stop members adjacent to the ends thereof movable to engage said drum, a support having lugs normally engaging said stop members, a pair of levers pivotally supported by said support having sliding engagement with each other to move said braking means into engagement with said drum, one of said stop members engaging its adjacent lug to prevent rotation of said braking means when said drum is turning in one direction, and the other of said stop members engaging its adjacent lug to prevent rotation of said braking means when said drum is turning in the opposite direction.

Signed by me at South Bend, Indiana, this 13th day of June, 1927.

ROBERT F. KOHR.